(12) United States Patent
Dewachter et al.

(10) Patent No.: US 8,344,077 B2
(45) Date of Patent: Jan. 1, 2013

(54) REDUCED BLOCKAGE WHEN TRANSFERRING POLYMER PRODUCT FROM ONE REACTOR TO ANOTHER

(75) Inventors: Daan Dewachter, Mechelen (BE); Daniel Siraux, Naast (BE); André Lewalle, Brussels (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 111 days.

(21) Appl. No.: 12/741,240

(22) PCT Filed: Nov. 4, 2008

(86) PCT No.: PCT/EP2008/064935
§ 371 (c)(1),
(2), (4) Date: Sep. 15, 2010

(87) PCT Pub. No.: WO2009/059968
PCT Pub. Date: May 14, 2009

(65) Prior Publication Data
US 2010/0331500 A1    Dec. 30, 2010

(30) Foreign Application Priority Data
Nov. 5, 2007 (EP) .................................. 07120021

(51) Int. Cl.
C08F 2/00 (2006.01)
C08F 210/00 (2006.01)
C08F 10/14 (2006.01)
C08G 85/00 (2006.01)

(52) U.S. Cl. .............. 526/59; 526/60; 526/61; 526/348; 526/348.5

(58) Field of Classification Search .................... 526/59, 526/60, 61, 348, 348.5
See application file for complete search history.

(56) References Cited

U.S. PATENT DOCUMENTS
8,026,322 B2   9/2011   Verleysen
2007/0037937 A1   2/2007   Damme FOREIGN PATENT DOCUMENTS
EP   1596981        6/2006
EP   1803498        7/2007
EP   1839742       10/2007
EP   1839742 A1 * 10/2007
EP   2055719 A1 *  5/2009

* cited by examiner

Primary Examiner — William Cheung

(57) ABSTRACT

This invention is related to the field of olefin polymerisation in double loop reactors and especially to the polymerisation of olefins with very active catalyst systems. It discloses a method for reducing blockage when transferring polymer product from the first loop to the second loop of a double loop reactor.

8 Claims, 3 Drawing Sheets a b c

REDUCED BLOCKAGE WHEN TRANSFERRING POLYMER PRODUCT FROM ONE REACTOR TO ANOTHER

CROSS-REFERENCE TO RELATED APPLICATIONS

This application claims the benefit of PCT/EP2008/064935, filed Nov. 4, 2008, which claims priority from EP 07120021.6, filed Nov. 5, 2007.

This invention is related to the field of olefin polymerisation in double loop reactors and especially to the polymerisation of olefins with very active catalyst systems. It discloses a method for reducing blockage when transferring polymer product from the first loop to the second loop of a double loop reactor.

Polyethylene (PE) is synthesised via polymerisation of ethylene ($CH_2$=$CH_2$) monomers and optional one or more comonomer(s). Because PE is cheap, safe, stable to most environments and easy to be processed, it is used in many applications. According to its properties, polyethylene is typically divided into several types, such as, but not limited to, LDPE (Low Density Polyethylene), LLDPE (Linear Low Density Polyethylene), and HDPE (High Density Polyethylene). Each type of polyethylene has different properties and characteristics and is thus used in different applications.

The polymerisation of ethylene is frequently carried out using monomer, diluent and catalyst, and optionally co-monomers and hydrogen, in a loop reactor. It is frequently performed under slurry conditions, wherein the polymer product usually consists of solid particles in suspension in a diluent. The slurry content of the reactor is continuously circulated with a pump in order to maintain efficient suspension of the polymer solid particles in the liquid diluent. The product is discharged by means of settling legs, which operate on a batch principle. Settling in the legs is used to increase the solids concentration of the slurry finally recovered as product slurry. The product is further discharged to a flash tank, through flash lines, where most of the diluent and unreacted monomers are flashed off and recycled. The polymer particles are dried, optionally additivated and the polymer is finally extruded and pelletised.

The double loop systems are quite desirable as they offer the possibility to prepare highly tailored polyolefins by providing different polymerising conditions in each reactor, typically by changing the amount of hydrogen and comonomer from one reactor to the other. In addition the double loop systems allow for a much longer cumulated residence time of the catalyst in the reaction zones than single loop systems, thereby improving the catalyst yield. Polymer product is transferred from the first to the second loop through one or several transfer line(s). Due to the batch nature of the discharge process, and taking into account the short periods of stagnation, the average velocity of the material circulating in the transfer line is of less than 1 m/s: there is thus a need to avoid sedimentation and clogging due to the polymerisation of residual monomers, especially when very active catalyst systems such as metallocenes are used.

There is thus a need to provide means either to accelerate the transfer and/or to reduce the reactivity of the catalyst inside the transfer line.

It is an aim of the present invention to accelerate the transfer of polymer product through the transfer line.

It is also an aim of the present invention to reduce the level of polymerisation occuring in the settling legs and in the transfer line.

It is also an aim of the present invention to reduce the residence time of the polymer in the settling legs.

Any one of these aims is, at least partially, fulfilled by the present invention.

Accordingly, in the homo- or co-polymerisation of ethylene and alpha-olefins in a slurry double loop reactor, the present invention provides a method for reducing sedimentation and subsequent clogging in the transfer line from one loop reactor to the other, that comprises the steps of:

a) decreasing the temperature in the first reactor to bring it to a temperature of from 5 to 7° C. lower than the swelling temperature; and/or b) increasing the pressure difference $\Delta p$ between the two reactors to a $\Delta p$ of from 1 to 3 bars and synchronising the reactor discharges as described in EP-A-1 803 498; and/or c) decreasing the residence time in each settling leg of the first reactor to a period of time such that the polymerisation performed within the settling legs does not induce a temperature elevation larger than the margin defined in a); and/or d) adjusting the rotational speed of the product take off valve located at the exit of each settling leg towards the transfer line in order to remove all the sedimented polymer as disclosed in EP-A-1 596 981.

The swelling temperature used here is fully described in co-pending European application n° EP07119993.9, page 9, line 26 to page 10, line 29 and in claims 1 to 10. It is calculated as a function of comonomer concentration and of polymer number average molecular weight. It further takes into account the solids content and the resin's molecular weight distribution.

Preferably all features a) through d) are present in order to prevent clogging in the transfer line.

BRIEF DESCRIPTIONS OF THE FIGURES

Figure 1:
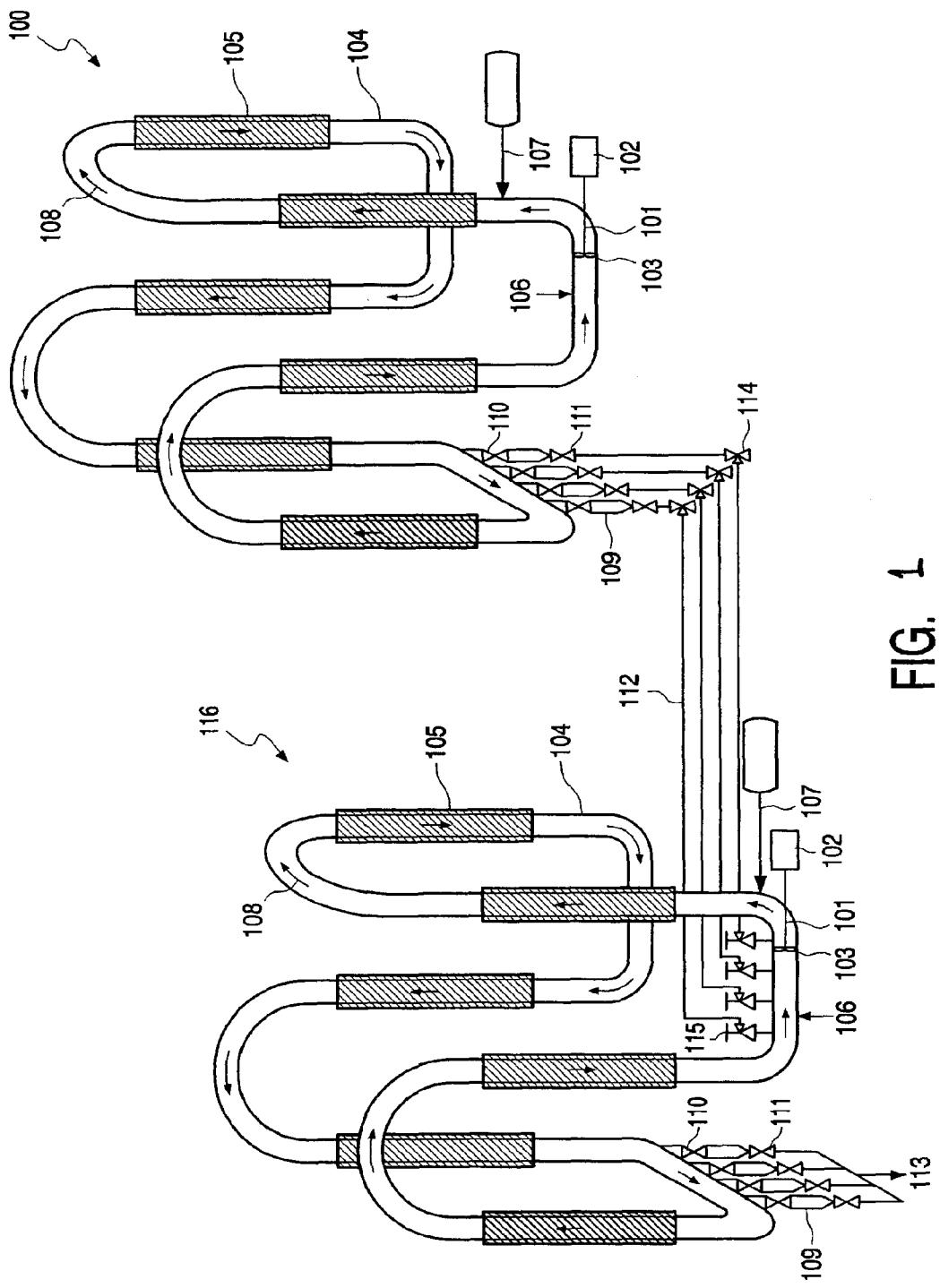
FIG. 1 represents two single loop reactors, which are interconnected in series.

FIG. 1 represents two single loop reactors 100, 116, which are interconnected in series. Both reactors 100, 116 consist of a plurality of interconnected pipes 104. The vertical sections of the pipe segments 104 are preferably provided with heat jackets 105. Reactants are introduced into the reactors 100 by line 107. Catalyst, optionally in conjunction with a co-catalyst or activation agent, may be injected in one or both reactors 100 and 116 by means of conduct 106. The polymerisation slurry is directionally circulated throughout the loop reactors 100, 116 as illustrated by the arrows 108 by one or more pumps, such as axial flow pump 101. The pumps may be powered by an electric motor 102. The pumps may be provided with a set of rotating impellers 103. The reactors 100, 116 are further provided with one or more settling legs 109 connected to the pipes 104 of the reactors 100, 116. The settling legs 109 are preferably provided with an isolation valve 110. Further the settling legs can be provided with product take off or discharge valves 111 or can be in direct communication with the downstream section. Downstream the exit of the settling leg 109 of reactor 100, a transfer line 112 is provided which allows to transfer polymer slurry settled in the settling legs 109 to the other reactor 116 through an inlet optionally equipped with a piston valve 115. Along transfer line 112, a three-way valve 114 may divert the flow to a product recovery zone if the multiple loop reactor has to be used in a parallel configuration. Polymer slurry settled in the settling legs 109 of reactor 116 can be removed by means of one or more product recovery lines 113, e.g. to a product recovery zone.

The temperature is advantageously kept a few degrees centigrade lower than the swelling temperature, typically 5 to 7° C., preferably about 6° C. The amounts of hydrogen, off-gas and hexene are adjusted in each reactor in order to obtain the desired specifications of the final product. It is possible to operate both loop reactors to provide polymers having the same melt index and the same density.

The line connecting two loop reactors is subject to a dynamic pressure difference wherein the pressure in the second reactor is controlled in real time by the pressure variations in the first reactor, in order to maintain a predetermined pressure difference. This mechanism is fully described in EP-A-1 803 498. The pressure difference between the two reactors of a double loop reactor is typically of 0.5 bars, but it must be noted that at the end of each dump the pressure difference between the two loops may be greater than or equal to the differential set-point value. In the present invention, the pressure difference between the two reactors is increased to be at least 1 bar. Preferably it is ranging between 1 and 2.5 bars, more preferably it is of from 1.5 to 2 bars. This insures a much more efficient flow when the product is transferred from one reactor to the other through transfer line 112.

The synchronisation of the reactor discharges is as described in EP-A-1 803 498. The pressure is typically controlled by interaction between a set-point value and dumping of the legs. Each time the set-point value is reached one leg is dumped and consequently, pressure drops to a value that is lower than the set-point value: this is essential to maintain control of the pressure. If the pressure drop is not sufficient, there exists a scenario for recovering control. This type of control is necessary for linking leg dumping that is a batch-wise process, to polymerisation in a loop reactor that is a continuous process. The set-point value of the second reactor is linked directly to the process value of the first reactor, using a dynamic control system.

The residence time in the settling legs is reduced. Indeed, the settling legs are not jacketed and are thus subjected to important heating when uncontrolled polymerisation occurs before the discharge of unreacted product. The level of unwanted heating can be estimated as a function of the variation of the catalyst system's reactivity caused by variations in temperature and concentrations. The residence time in a settling leg is typically of about 40 s. In the present invention it is reduced to be at most 30 s, preferably at most 20 s. It is possible to estimate the amount of heating caused by unwanted polymerisation as a function of residence time in the settling legs. For example, for a residence time of about 20 s, the elevation of temperature is of the order of 6° C. for normal operating conditions. The consumption of monomer within the settling leg is estimated by measuring the concentration of monomer of the product exiting the leg. The monomer concentration at the exit of the reactor is typically of from 5 to 8 wt %. Its concentration estimated in the reactor is about 0.75 wt % more than that measured at the exit of the reactor. For comparison, would the residence time in the settling leg be of 40 s, the elevation of temperature would be of the order of 10° C. for similar polymerisaton conditions.

The polymer product is released from the settling leg through a rotating product take-off valve 111 located at the end of each settling leg. The valve can be either a 180° or a 90° rotating valve. This mechanism is fully described in EP-A-1596981. It allows a charge of particles to flow out of the settling leg, the product take-off valve being operated by a pneumatically driven double-acting actuator that operates the 180° rotating product take-off valve. Preferably, the valve is rotated at a rotation speed that is sufficient to allow complete evacuation of sedimented product. Typical rotation speed is of 180 degrees in 1. to 2.5 s, preferably in 1.5 to 2 s. The pneumatic system is regulated by a mechanism comprising pneumatic control valves characterised in that the control valves are V-ball valves. Preferably, the control valves are automatic control valves.

Figure 2:
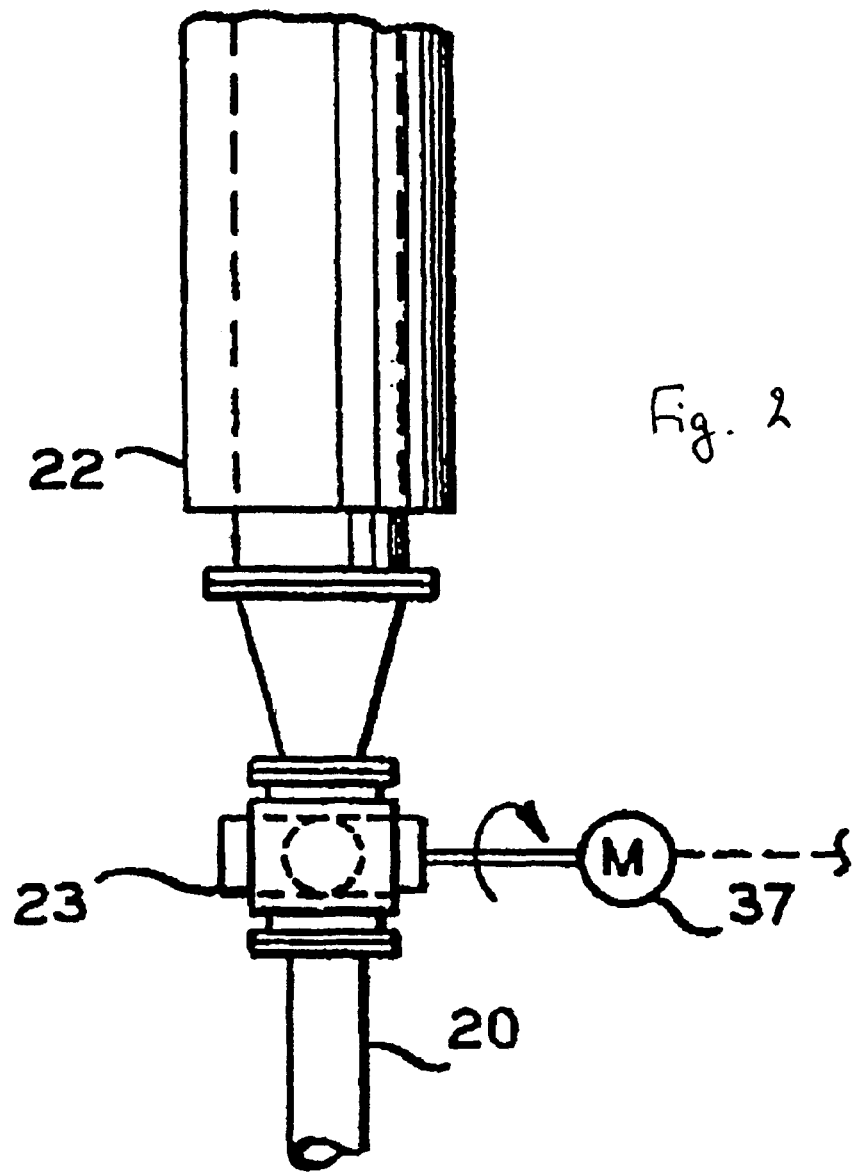
FIG. 2 shows an inferior part of a settling leg with a product take-off (PTO) valve connecting it to a conduit.

FIG. 2 shows the inferior part of a settling leg 22, with a product take-off (PTO) valve 23 connecting it to conduit 20. The PTO valve is a rotating valve, the rotation being controlled by a mechanism M.

PTO valve 23 of settling leg 22 is periodically opened, whereby the polymer particles present in settling leg 22 pass into conduit 20. The opening time of PTO valve 23 is closely controlled, in order to allow substantially all particles present in settling leg 22 to pass into conduit 20, whilst substantially no free monomer and free diluent leave the reactor.

Two types of PTO valves are in use. The most common relies on a 180° rotation of the moving part of the valve, whereby the valve turns from closed) (0°) to open (90°) then closed (180°) in a continuous smooth rotation; during the next cycle, the valve rotates backwards. Valves with a 90° rotation are also in use, whereby the moving part turns from closed (0°) to open (90°), remains in that open position for some time and then rotates backwards to closed (0°).

PTO valves are generally pneumatically actuated. It can be seen on FIG. 3a that each PTO valve 23 is provided with a double acting pneumatic actuator 40, that controls the rotation speed. In the case of a 180° rotation, the rotation speed of the PTO is particularly important: it directly controls the time during which it remains open.

Figure 3:
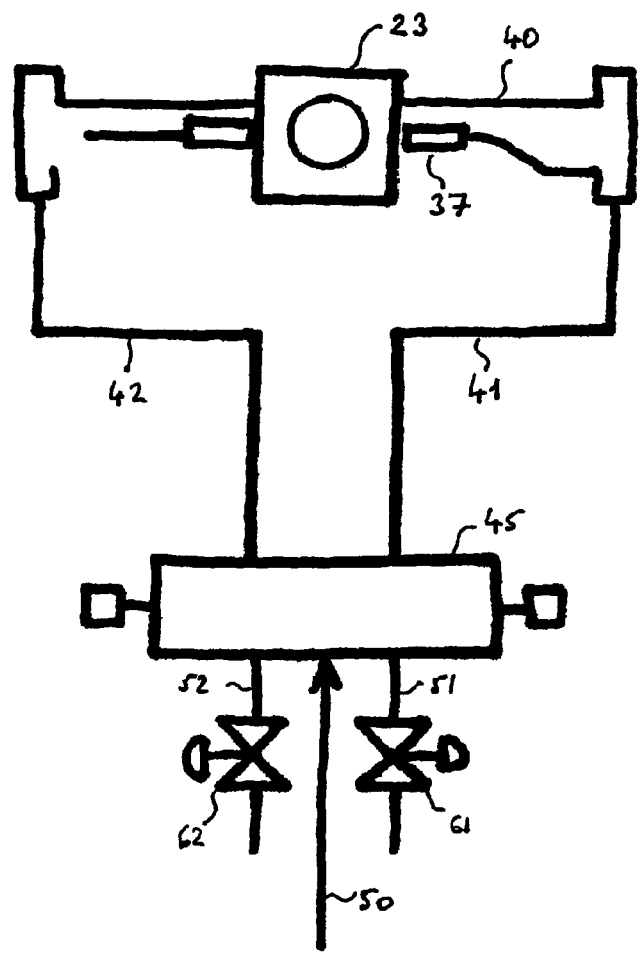
FIG. 3a shows PTO valves provided with a double acting pneumatic actuator that controls rotation speed.
FIG. 3b shows one position of a system.
FIG. 3c shows another position of the system.
Figure 3:
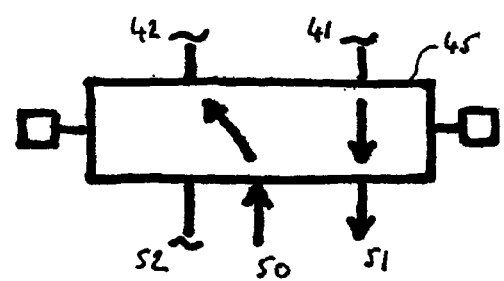
Figure 3:
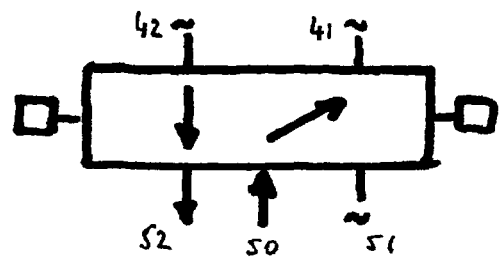

The airflow sent to the double acting pneumatic actuator 40 is directed by a two-way system 45 driven by a solenoid. FIG. 3b shows one position of system 45, wherein air coming from conduit 50 is sent via conduit 42 into actuator 40, returns via conduit 41 and exits through conduit 51. FIG. 3c shows the other position of system 45, wherein air coming from conduit 50 is sent via conduit 41 into actuator 40, returns via conduit 42 and exits through conduit 52.

Control valves 61 and 62 adjust the outlet flow of air in order to control the pneumatically actuated PTO valves. There is provided a separate control for each of valves 61 and 62, in case the ball in PTO valve 23 does not turn at the same speed in both directions. Preferably control valves 62 and 63 are controlled automatically.

The catalysts system used in the present invention is preferably very active. The preferred catalyst system is based on a metallocene or a Ziegler-Natta catalyst component and an activating agent. More preferably, it is a metallocene catalyst system. Any metallocene catalyst component known in the art can be used.

A metallocene catalyst component is described as a transition metal complex consisting of metal atoms bonded to one or two ligands. In a preferred embodiment, the metallocene catalyst has a general formula MX, wherein M is a metal group 4 of the Periodic Table and wherein X is a ligand composed of one or two groups of cyclopentadienyl (Cp), indenyl, fluorenyl or their derivatives. More preferably, the metallocene catalyst component is ethylene-bis-tetrahydroindenyl zirconium dichloride or bis-(n-butyl-cyclopentadienyl) zirconium dichloride or dimethylsilylene-bis(2-methyl-4-phenyl-indenyl) zirconium dichloride. The most preferred metallocene component is ethylene-bis-tetrahydroindenyl zirconium dichloride.

It must be activated with an activating agent having an ionising action. The preferred activating agents are selected from aluminoxane or boron-containing complexes. The most preferred activating agent is methylaluminoxane (MAO).

The catalyst component is preferably supported on a silica support impregnated with MAO. Alternatively a fluorinated activating support, as described in EP-A-1 709 091 can be used as activating agent thereby suppressing the need for MAO.

The present invention is used in the homo- or co-polymerisation of ethylene and alpha-olefin in a slurry double loop reactor. The monomer is preferably selected from ethylene or propylene. More preferably, it is ethylene. Comonomers, which are suitable for use in accordance with the present invention, may comprise but are not limited to ethylene and aliphatic $C_3$-$C_{20}$ alpha-olefins. Examples of suitable aliphatic $C_3$-$C_{20}$ alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene. A particularly preferred embodiment according to the present invention concerns the copolymerisation of ethylene and hexene.

Diluents which are suitable for being used in accordance with the present invention may comprise but are not limited to hydrocarbon diluents such as aliphatic, cycloaliphatic and aromatic hydrocarbon solvents, or halogenated versions of such solvents. The most preferred diluent is isobutane.

The invention claimed is:

1. A method for reducing sedimentation and subsequent clogging in a transfer line from one loop reactor to another for the polymerization of olefins comprising:
    setting a temperature in a first reactor at a margin of from 5 to 7° C. lower than a swelling temperature;
    increasing a pressure drop Δp between the first and second reactors to a Δp of from 1 to 5 bars and synchronising reactor discharges;
    decreasing a residence time in each settling leg of the first reactor to a period of time such that the polymerisation performed within the settling legs does not induce a temperature elevation larger than the margin; and
    adjusting a rotational speed of a product take off (PTO) valve located at the exit of each settling leg towards the transfer line in order to remove all sedimented polymer.

2. The method of claim 1, wherein the temperature is about 6° C. lower than the swelling temperature.

3. The method of claim 1, wherein the pressure difference between the first and second loop reactor is of from 1 to 2.5 bars.

4. The method of claim 3, wherein the pressure difference between the first and second loop reactor is of from 1.5 to 2 bars.

5. The method of claim 1, wherein the residence time in the settling leg is of at most 20 s.

6. The method of claim 1, wherein the product take-off valve located at the exit of each settling leg is either a 180° or a 90° rotational valve.

7. The method of claim 1, wherein the rotational speed of the PTO valve located at the exit of each settling leg is of the order of 180 degrees in 1.5 to 2 s.

8. The method of claim 1, wherein the is ethylene and an optional comonomer is hexene.

* * * * *